United States Patent Office 3,333,022
Patented July 25, 1967

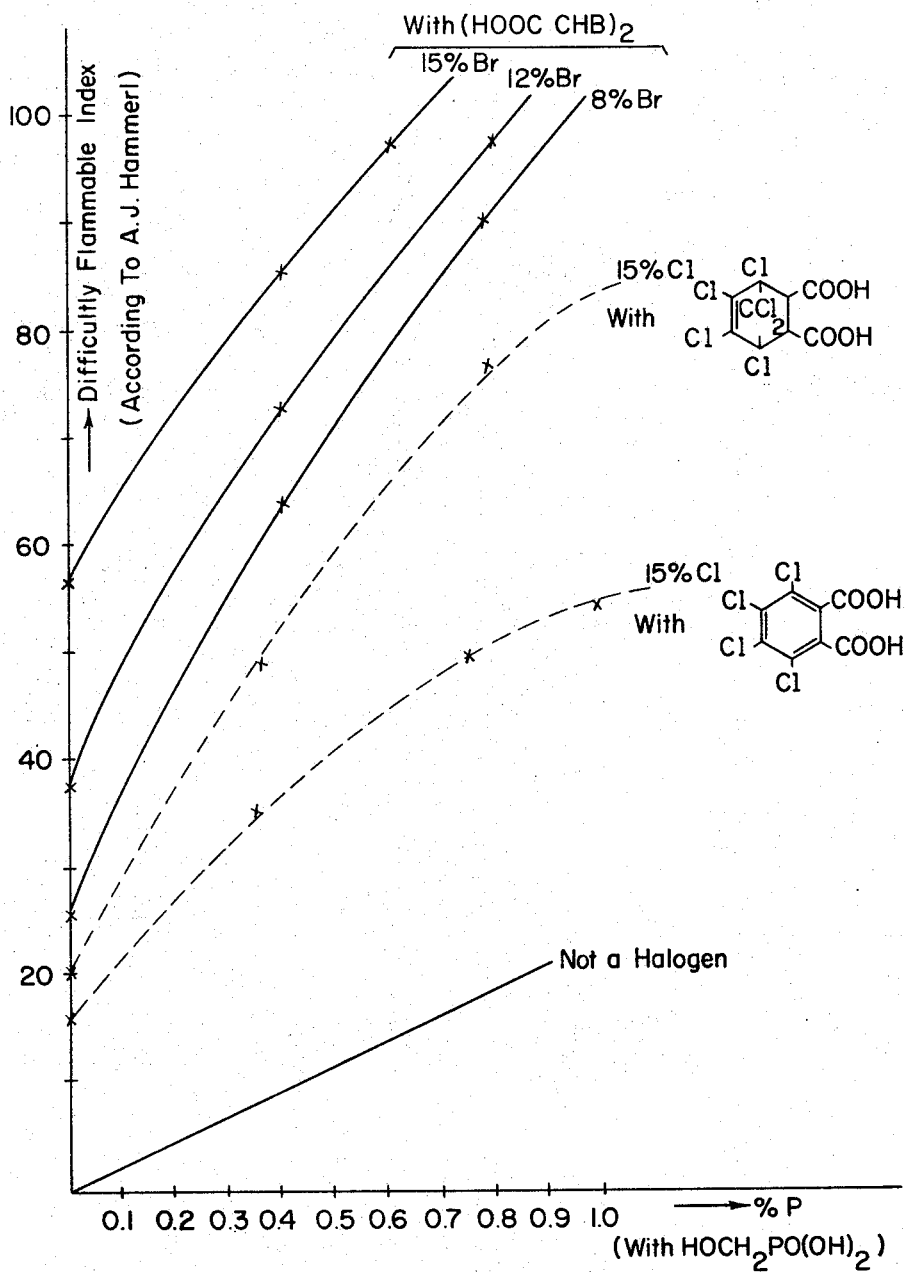

3,333,022
FLAME RETARDANT RESINS PREPARED FROM UNSATURATED POLYESTERS AND DICYCLOPENTADIENE
Fritz Reiners, Rolf Zimmermann, and Dieter Zingel, Wiesbaden-Biebrich, Germany, assignors to Chemische Werke Albert, Wiesbaden-Biebrich, Germany, a corporation of Germany
Filed Oct. 19, 1964, Ser. No. 404,643
Claims priority, application Germany, Oct. 30, 1963, C 31,270
19 Claims. (Cl. 260—869)

This invention is concerned with improvements in or relating to polyesters, in particular it is concerned with fire-retarding polyesters and a process for their manufacture.

Saturated and unsaturated polyesters containing halogen and/or phosphorus and having fire-retarding properties have previously been proposed. These polyesters may also be copolymerised with olefinicaly unsaturated monmers or reacted with polyisocyanates and moulded to form bodies, which may have a cellular structure. A difficulty inherent in the condensation of halogen-containing compounds in the formation of polyesters is the fact that at a certain degree of condensation the esterification rate suddenly decreases, as a result of which the products obtained have a high acid value. The resistance of these products to water and to many solvents is not entirely satisfactory and therefore their use as a component in the production of fire retarding shaped bodies is not recommended.

It has also been proposed to use polyesters, produced by the addition of dialkylphosphites to unsaturated polyesters and subsequent bromination, as an ingredient in polyester moulding materials, and also to react addition products of dialkylphosphites with a bromine-containing maleic acid/ethylene glycol polyester to form unsaturated polyesters. Thus, the bromination is carried out in each case as a preliminary stage. However, the bromination of an unsaturated polyester is difficult due to its high viscosity and the fact that the unreacted bromine can only be removed with difficulty to give a polyester which is not strongly discoloured is also disadvantageous.

The present invention provides a process for the production of fire-retardant, or self-extinguishing, polyesters which avoids the step of brominating a polyester.

According to the present invention there is provided a fire-retardant polyester resin (II) comprising the condensation product of dicyclopentadiene with a polyester resin (I), said resin (I) being obtained by reacting a mixture of (A) one or more dicarboxylic acids and/or one or more ester-forming functional derivatives of said acids, (B) one or more bromine-containing carboxylic acids, (C) one or more condensable phosphorus-containing compounds as herein defined, and (D) one or more polyhydric alcohols and/or one or more ester forming functional derivatives thereof, in which mixture at least 20% of the total amount of equivalents of the carboxylic acid component and the hydroxy component contains a polymerisable or copolymerisable olefinic bond. The mixture of the, preferably $\alpha,\beta$-olefinically unsaturated dicarboxylic acid or the functional derivative thereof (A), the bromine-containing carboxylic acid (B), and the compound containing condensable phosphorus as defined below (C), are preferably reacted with a polyhydric alcohol, until the mixture has an acid value of not more than 150. Then dicyclopentadiene is added thereto and the mixture is further condensed preferably until the acid value is below 70, more preferably below 50. The sum of the bromine and phosphorus in the final product must be at least 2% by weight. Further components may, if desired, also be used, such as (E) mono- and/or polybasic, if desired halogen-containing carboxylic acids and/or (F) monohydric alcohols and/or (G) monohydric and/or polyhydric halogenated alcohols. Monohydric alcohols and/or monobasic carboxylic acids are usually, however, only used in minor proportions in order to compensate for the presence of any excess hydroxyl and/or carboxylic groups. These excess carboxylic and hydroxyl groups are generally present when tribasic or higher polyfunctional carboxylic acids and trihydric or higher hydric alcohols are present.

The mixture of (A)–(D) used may thus, for example, be a mixture of 0.4 to 0.8 mol, preferably 0.5 to 0.7 mol, of an $\alpha,\beta$-olefinically unsaturated dicarboxylic acid, 0.5 to 0.4 mol, preferably 0.1 to 0.3 mol of a bromine-containing carboxylic acid and 0.01 to 0.2 mol of the phosphorus-containing compound and polyhydric alcohols. These mixtures of (A)–(D) may conveniently be condensed at a temperature of from 140 to 220° C. until the acid value of the resin (I) is from 70 to 150, preferably from 100 to 130. Here the polyhydric alcohols are preferably used in amounts which are essentially equivalent to the acidic groups of the other starting substances, or to a greater or lesser extend up to 50 equivalent percent more or less than the equivalent amount. They may also partially be used in the form of a precondensate with the acids, e.g. as terephthalic acid bis-(ethylene glycol)-ester. The resin (I) is then mixed with dicyclopentadiene, preferably from 0.05 to 0.6, and more preferably 0.1 to 0.4 mol of dicyclopentadiene per mol of dicarboxylic acid present in the mixture (A)–(D), preferably under conditions under which the dicyclopentadiene is in the liquid state. At ordinary pressure, therefore, a temperature between 100 and 140° C. is preferred. The reaction mixture is then preferably kept at this temperature until the dicyclopentadiene is substantially condensed. Thereafter the condensation may be continued at a temperature above 160° C. and preferably not above 220° C. until the acid value has fallen to a value between 20 and 70 and is preferably below 50 and above 30. If the mixture is condensed to a low acid value, e.g. of 70–90 before the addition of dicyclopentadiene, it is condensed to the extent that the acid value is reduced by at least 20 units after the addition of dicyclopentadiene. Generally the final product contains at least 2, preferably at least 4% by weight of bromine and at least 0.2, preferably at least 0.4% by weight of phosphorus. During the reaction it is often convenient to remove the water formed during the condensation. This may, for example be achieved by a stream of inert gas or a solvent forming an azeotrope with water, such as toluene, xylene or other entrainers.

In the mixture (A)–(D) used to produce the resin (I) the alcohols and carboxylic acids are generally used in a weight ratio such that the hydroxyl and carboxyl groups are present in essentially equivalent amounts. This does not exclude the presence of an excess of one of the components, preferably the polyhydroxy compound in the composition.

The reaction with dicyclopentadiene has the effect of materially reducing the acid value of the polyester within a short time without impairing the properties of the polyesters. This is probably due to a reaction between the free carboxyl and hydroxyl groups and the dicyclopentadiene to form esters and ethers respectively. For example, the esterification rate of dibromosuccinic acid slows down, when the acid value reaches 120, to such an extent that further polycondensation, under the conditions which are normally used in the manufacture of polyesters free from halogen and phosphorus, does not take place. To effect further condensation without adding dicyclopentadiene it is necessary to use temperatures above 210° C. to 220° C. Aliphatic bromocarboxylic acids, such as dibromosuccinic acid, and the esters thereof decompose at such temperatures with accompanying rapid discolouration of the resin.

The esterification to produce the resin (I) is conveniently carried out in the presence of an esterification catalyst such as sulphuric acid, hydrochloric acid, zinc chloride, zinc stearate and p-toluene sulphonic acid. Particularly preferred catalysts include arylphosphites, for example, those based on phenols, which may contain alkyl substituents having altogether up to 4 carbon atoms, preferably triphenylphosphite. These catalysts are preferably used in an amount of 0.01 to 5, preferably 0.02 to 2%, by weight based on the weight of polybasic acids used, and prevent discolouration of the unsaturated polyesters at elevated temperatures.

$\alpha,\beta$-Olefinically unsaturated dicarboxylic acids or anhydrides thereof, which may be used include for example maleic acid, fumaric acid, itaconic acid, mesaconic acid, citraconic acid or anhydrides of these compounds, where such exist, or half-esters of any one of these acids with a polyhydric alcohol, such as one of the alcohols mentioned below. These half-esters can for example be obtained by reacting one equivalent of the unsaturated acid or the anhydride of such an acid, with one equivalent of a polyhydric alcohol or an alkylene oxide respectively.

The dicarboxylic acid (A) may be replaced in the mixture by not more than 60, preferably not more than 50 equivalent percent of dibasic carboxylic acids, which contain no triple or polymerisable double bonds (or the anhydrides thereof where such exist), such as succinic, adipic, sebacic, azelaic, ortho-, iso- and terephthalic acid, tetra-hydrophthalic acid, chlorine-containing carboxylic acids such as dichloro-, trichloro-, tetrachlorophthalic acid, the corresponding chlorinated iso- and terephthalic acids and hexachloroendomethylenetetrahydrophthalic acid. Minor proportions, e.g. up to 20 or even 25 equivalent percent of the amount of dicarboxylic acids, of higher polybasic acids may also be used with the above listed replacement acids, examples of such higher polybasic acids being trimellitic acid and pyromellitic acid. Where these acids contain more than 2 carboxylic groups, the additional carboxyl groups may be esterified by monohydric alcohol radicals, e.g. by alkyl radicals having 1 to 6 carbon atoms. The $\alpha,\beta$-unsaturated dicarboxylic acids may also be replaced to a still higher extent or even completely by these other replacement acids, if a corresponding portion of olefinic bonds is present in the hydroxy component, e.g. in the form of $\Delta^{2,3}$-butene-1,4-diol.

Suitable polyhydroxy compounds include for example, ethylene glycol, diethylene glycol, 1,2- or 1,3-propanediol, 2,2-dialkanepropanediols (e.g. the dimethyl compound), 1,3-butanediol, 1,4-butanediol, $\Delta^{2,3}$-butene-1,4-diol, 1,6-hexanediol, a dimethylol benzene (and nuclear substituted derivatives thereof), resorcinol, 4,4'-dihydroxy-dicyclohexyl alkanes, 4,4'-dihydroxydiphenylalkanes, 4,4'-dihydroxy-3,3'-dialkyldiphenylalkanes, e.g. the -2,2-propanes, the bis-ethylene, bis-propylene or bis-butylene glycol ethers of 4,4'-dihydroxydicyclohexyl alkanes of 4,4'-dihydroxydiphenylalkanes or of 4,4'-dihydroxy-3,3'-dialkyldiphenylalkanes, and trimethylol propane.

Suitable halogen-containing alcohols which may be used include for example glycerol-monochlorohydrin, pentaerythritoldichlorohydrin, pentachlorophenylmonoglycerol ether, 4,6-dibromoresorcinol-bis-($\beta$-hydroxyethyl)-ether and tetrabromo-O,O-bis-($\beta$-hydroxyethyl)-diphenoxypropane. Trihydric and also higher hydric alcohols may also be used where the third or further hydroxy groups respectively are etherified or esterified so that the hydroxy compounds still contain 2 free hydroxy groups. Examples of such compounds include monoethers of glycerol, trimethylol ethane or trimethylol propane with allyl alcohol, benzyl alcohol, stearyl alcohol, oleyl alcohol, and mixtures of fatty alcohols; diethers of said alcohols with pentaerythritol; and the esters of said alcohols with acetic acid, benzoic acid and other monocarboxylic acids. Generally polyhydric alcohols are preferred which contain only primary hydroxy groups. When using secondary alcohols an undesired reaction with aliphatic bromocarboxylic acids, such as dibromosuccinic acid, may occur whereby the bromine content of the resin will be reduced, if volatile bromine-containing products are formed.

Preferred bromine-containing carboxylic acids (B) include polyfunctional carboxylic acids having at least two bromine atoms in the molecule. The polybromo addition products of unsaturated carboxylic acids such as maleic, fumaric, itaconic, mesaconic, citraconic, acrylic, ricinoleic or linseed oil fatty acid are particularly preferred in account of their easy availability. Bromo derivatives of polyfunctional carboxylic acids which are especially stable are particularly preferred such as the dibromo addition products of dicarboxylic acids having a transconfiguration. Di- and tetrabromophthalic acid, hexabromoendomethylenetetrahydro-, dibromohexahydro- and dibromoendomethylene-hexahydrophthalic acid are also suitable.

By the term "phosphorus containing compounds" (C) as used herein we mean a mono- or poly-functional phosphorus containing compound which, on condensation with the other compounds of the resin mixture (A), (B) and (D), yields a polyester resin (I) containing chemically bound phosphorus.

Phosphorous-containing compounds belonging to the following classes as well as condensable derivatives thereof are suitable; acids, thioacids, amides, organic oxides, organic sulphides, esters, thioesters and halides including the phosphonium halides. Examples of such compounds are phosphoric acid, pyrophosphoric acid, phosphorous acid, the phosphinic acids such as the bis-(hydroxymethyl)-phosphinic acid or the homologous hydroxyalkylphosphinic acids, and the phosphonic acids, such as ethyl-, vinyl-, phenyl-, $\beta$-chloroethyl-, hydroxymethane-, and 2-hydroxypropane-2-phosphonic acid. The esters or halides of these acids may also be used, and further such esters, which have been obtained from the said acids by reaction with an alkylene oxide such as ethylene oxide or propylene oxide; as well as trimethylol phosphine oxide or tetramethylol phosphonium halides. Sulphur-containing phosphorous compounds, may also be used, for example phosphine sulphides, thiophosphites, thio- or dithiophosphates and nitrogen-containing phosphorus derivatives, e.g. phosphonic acid amides, amido-phosphites or -phosphates, whereby end products having special properties are obtained.

The fire-retardant polyesters (II) obtained according to the invention are light, storable and generally clear substances having an acid value of not more than 70 and preferably at least 20. The characteristics and properties of the resins (II) of the present invention make them very useful in the production of fire-retardant moulding materials and more so than previously proposed products prepared without using dicyclopentadiene, even those containing halogen and phosphorus. Due to their low acid and hydroxyl values they have a good resistance against water and aqueous solutions.

Although the fire retardant polyester resins (II) of the invention may be used as such their main use lies in the manufacture of (if desired foamed, or fibre reinforced) plastics; for example they may be utilized in the isocyanate polyaddition process, and especially as an ingredient in polyester moulding materials which term is used also to include injection-moulding and casting resin compositions. In the latter case these resins are polymerised with ethylenically unsaturated polymerisable monomers. This polymerisation is conveniently carried out, after stabilisation with a polymerisation inhibitor such as hydroquinone, preferably at elevated temperatures and/or in the presence of a free-radical forming catalyst. Suitable unsaturated polymerisable monomers include styrene, styrenes alkylated or chlorinated in the nucleus, α-methyl styrene, vinyl acetate, vinyl propionate, acrylic and methacrylic acid esters, e.g. esters of methyl, ethyl, propyl, butyl, isobutyl or allyl alcohol, allyl esters, e.g. allyl acetate, allyl propionate, diallyl maleate, diallyl fumarate, diallyl succinate, diallyl adipate, diallyl azelate, diallyl sebacate and diallyl phthalate, triallylphosphate, triallyl cyanurate, diallyl benzene phosphonate and N-vinylpyrrolidone. The ratio of the said vinyl compounds (all of which have the group $CH_2=C<$), to ester is generally in the range from 4:1 to 1:9, preferably from 1:1 to 1:4.

If the polymerisation with an ethylenically unsaturated monomer occurs spontaneously in the presence of a free-radical forming agent the reaction may be carried out either at room temperature or at elevated temperature, preferably between 30 and 120° C. In this case a conventional accelerator may be added. Suitable catalysts are for example benzoyl peroxide, 2,4-dichlorobenzoyl peroxide, tert.-butylperoxide or -hydroperoxide, lauroyl peroxide, cyclohexylhydroperoxide, cyclohexanoneperoxide, methylethylketone peroxide and tert.-butyl perbenzoate. Suitable accelerators include for example dimethyl aniline and dimethyl toluidine, or when the catalyst is a hydroperoxide also cobalt octoate or cobalt naphthenate, if desired in admixture with lauryl mercaptan. It is also possible to condense amines, which are accelerators in their own right, having carboxylic or hydroxyl groups during the process for preparing the polyesters (I) of the invention. Examples of such amines are anilino-N,N-diacetic acid, p-toluidino-N,N-diacetic acid, N,N-bis-(hydroxyethyl)-aniline or p-toluidine. The use of these amines results in the production of polyesters (II) which can be hardened at room temperature to give shaped bodies merely by the addition of an organic peroxide, such as benzoyl peroxide.

The following polyisocyanates are suitable for reaction with the polyesters (II) by a polyaddition process: 4,4'-diphenylmethane-diisocyanate, 1,5-naphthylenediisocyanate, 2,2'-diphenyldimethylmethane-4,4'-diisocyanate, toluylene-2,4-diisocyanate and/or toluylene-2,6-diisocyanate, 1,4-cyclohexylenediisocyanate and 4,4',4''-triisocyanatophenylthiophosphate. This reaction can conveniently be carried out at a temperature of from 80 to 150° C., preferably from 80 to 130° C. either in the melt or in solution in a solvent which is inert to NCO-groups.

The above mentioned shaping compositions obtained from the polyesters (II) of the invention are suitable for the manufacture of fire-retardant shaped bodies and coatings, which have good mechanical and electrical properties and colour values comparable to unsaturated polyesters free from halogen and phosphorus. Thus the copolymerisation product of a resin produced by polymerizing a polyester resin (II) obtained according to the invention with dibromosuccinic acid and having a bromine content of 7% by weight, a phosphorus content of 0.6% by weight, and a colour value of 2–4 (according to DIN 6162) with styrene in a weight ratio 70:30, has a bending strength of about 1800 kg./cm.$^2$ and a resistance to current leakage by surface discharge (surface leakage) (according to DIN 53 480) of T 5, i.e. it conforms to the highest quality standard. The resin produced furthermore has a dielectric constant of 2.9, a dielectric loss factor (tan $\sigma$) of 0.004 and in both the dry and wet states a specific direct resistance of $9.10^{15}$ ohm cm. Due to these excellent electric properties the resin may even be used for the construction of electric insulators and electric circuit elements. Plastics based on the polyester resins (II) of the present invention, due to the combination of their flame resistance and very good mechanical properties have a variety of uses in the construction field.

Fillers, such as asbestos, chalk, pulverized glass, silicon carbide, sawdust, hardened condensation or polymerisation plastics, calcium hydrogen phosphate, glass or textile fibres such as cotton, polyester or polyamide fabrics and/or inorganic or organic dyestuffs, may also be incorporated into the shaping compositions. In some cases the fire-retardant properties may also be enhanced by the use of certain fillers, e.g. antimony trioxide. The fire-retardant properties of shaped bodies and coatings based on polyesters which have been produced by using aliphatic polybromo compounds according to the present invention are demonstrated, with reference to the accompanying drawing, for polyesters based on dibromosuccinic acid. In the accompanying drawing the graph shows a plot of percent phosphorus (the abscissa) against the flame resistance index according to A. J. Hammerl see below (the ordinate).

It is evident from the drawing that the degree of inflammability is reduced, although the halogen and phosphorus content is lower than in previously proposed polyesters. The drawing shows the extent of the fire-retardant properties expressed by the "flame resistance index according to A. J. Hammerl" (see 17th Annual of Technical and Management Conference Reinforced Plastics Division, February 1962, Chicago, Section 12-H, pages 1–6), which is measured on round sticks, 8.5–8.6 mm. thick, of copolymerisation products of the polyesters with styrene. The flame resistant indices of these resins having a bromine content of 8, 12 and 15% respectively and certain phosphorus contents are compared with those of a halogen-free resin, a resin having 15% of chlorine in the form of tetrachlorophthalic acid and a further resin having 15% of chlorine in the form of hexachloro-endomethylene tetrahydrophthalic acid, which had been produced by previously proposed processes. All of these resins have been produced from otherwise similar carboxylic acids and alcohols.

In the compositions and processes of the present invention, mixtures of compounds of a given class may in all cases be used, e.g. several alcohols or bromine- or phosphorus-containing compounds, may be used instead of one compound alone.

The invention will now be illustrated with reference to the following examples in which all parts, ratios and percentages are given by weight except where otherwise specifically indicated.

*Example 1*

A mixture of 107.8 parts of maleic anhydride, 88.8 parts of phthalic anhydride, 55.1 parts of α,α'-dibromosuccinic acid, 11.1 parts of 90% phosphoric acid, 136.4 parts of ethylene glycol and 0.046 part of hydroquinone was gradually heated to 110–120° C., carbon dioxide being meanwhile slowly passed therethrough, in the presence of 0.26 part of triphenyl phosphite as catalyst, in a flask which was provided with a stirrer, a thermometer, a receiver and a gas inlet tube. This temperature was maintained for 30 minutes; then the mixture was heated over 3 hours to 200° C. maintained at this temperature for 5 hours. The reaction mixture, which had an acid value of 120, was then cooled to 100–120° C., mixed with 60 parts of dicyclopentadiene to give a turbid mixture and held for 1 hour at this temperature range. The mixture of resin (I) and dicyclopentadiene was then heated in the course of one hour to 180° C. and the resulting melt which clarified after about 30 minutes was held for a further 1 to 1.5 hours at 180–190° C.; towards the end of this time a water jet pump vacuum was applied. The resulting resin (II) having an acid value of 45 was mixed with 168 parts of styrene and well stirred. 560 parts of a light-yellow, tough, resin solution was obtained which after mixing with 2% of a 50% benzoylperoxide paste could be hardened at 90 to 100° C. to give yellowish, solid, moulded bodies having good mechanical properties, viz a bending strength of 1700 kg./cm.$^2$. The resistance to surface leakage conforms to standard T 5 of DIN 53 480.

Moulded bodies having good properties were also obtained using a process similar to that of Example 1, but adding (a) only 30 parts of dicyclopentadiene and similarly (b) using 11.3 parts of hydroxymethane phosphonic acid in place of 11.1 parts of 90% phosphoric acid and 90 parts of dicyclopentadiene instead of 60 parts; the last-mentioned resin (b) had, an acid value of 30–35 before polymerisation.

98 parts of maleic anhydride, 103.5 parts of phthalic anhydride and 17 parts of the reaction product from 36.6 parts of 90% phosphoric acid with 26 parts of ethylene oxide were used in the general procedure of Example 1 together with the other constituents and amounts thereof, recited in Example 1, an 8.5 mm. thick round stick of the copolymer formed had an index of flame resistance of 50 according to Hammerl.

Example 2

A mixture of 940 parts of maleic anhydride, 592 parts of phthalic anhydride, 441 parts of α,α'-dibromosuccinic acid, 112 parts of 2-hydroxypropane-2-phosphonic acid and 1091 parts of ethylene glycol was condensed after mixing with 2.1 parts of triphenylphosphite (as esterification catalyst) and 0.37 part of hydroquinone, for 1 hour at 120° C. and for further 4 hours at 160–180° C. The resulting melt had an acid value of 113. The product was cooled to 120° C., mixed with 480 parts of dicyclopentadiene, reheated over 1 hour to 180° C. and condensed at this temperature for further 90 minutes, while subjecting the mixture to a water jet pump vacuum during the last 20 minutes. A product having an acid value of 37 was obtained in nearly quantitative yield which after dilution with 1330 parts of styrene had a colour value of 2–3 (according to DIN 6162). On hardening with 2% of a 50% benzoylperoxide paste at 90 to 100° C., shaped bodies were obtained which had a bending strength of 1700–1800 kg./cm.$^2$, an impact resistance of about 18 kg. cm./cm.$^2$ and a resistance to surface leakage conforming to standard T 5 of DIN 53 480. The moulded bodies had a very good resistivity to many solvents. Thus, for example, the bending strength of test sticks after heating for 6 hours to 70° C. with concentrated acetic acid, toluene or carbon tetrachloride was reduced by less than 5%. The index of flame resistance of an 8.5 mm. thick round stick was 70 to 75 (according to Hammerl).

Example 3

A polyester was prepared from 118 parts of maleic anhydride, 127 parts of terephthalic acid-bis-(β-hydroxyethyl)-ester, 55.1 parts of α,α'-dibromosuccinic acid, 14 parts of 2-hydroxypropane-2-phosphonic acid, 74.5 parts of ethylene glycol and 60 parts of dicyclopentadiene using the general method of Example 2 in the presence of 0.26 part of triphenyl-phosphite and 0.05 part of hydroquinone. 400 parts of a resin having an acid value of 33 were obtained, the mixture of which with styrene (ratio 70:30) had a viscosity of about 2700 cp. at room temperature. An 8.5 mm. thick round stick produced from this solution had a flame resistance index of about 95 (according to Hammerl).

Example 4

A polyester was prepared from 107.8 parts of maleic anhydride, 88.8 parts of phthalic anhydride, 55.1 parts of α,α'-dibromo-succinic acid, 14 parts of 2-hydroxypropane-2-phosphonic acid, 114.4 parts of 2,2-dimethylpropane-diol-1,3 and 68.2 parts of ethylene glycol using the general method of Example 2. The esterification speed in this example was faster than in Example 2 and the turbidity described in Example 1 occuring upon the addition of 60 parts of dicyclopentadiene did not occur. The resin obtained had an acid value of 28. The bending strengths of moulded bodies prepared from this resin after polymerisation with styrene in the ratio 70:30 were about 1500 kg./cm.$^2$.

Example 5

A polyester resin was prepared from 78.4 parts of maleic anhydride, 118.4 parts of phthalic anhydride, 55.1 parts of α,α'-dibromosuccinic acid, 14 parts of 2-hydroxypropane-2-phosphonic acid, 12.2 parts of benzoic acid, 130.2 parts of ethylene glycol, 11.8 parts of trimethylolpropane and 60 parts of dicyclopentadiene using the general method of Example 2 in the presence of 0.25 part of triphenylphosphite and 0.4 part of hydroquinone. On copolymerisation of the resulting resin with styrene in the ratio of 70:30 a copolymer was produced having a bending strength of 1200 kg./cm.$^2$ and a resistance to surface leakage conforming to the standard T 5 of DIN 53 480.

Example 6

A mixture of 117.6 parts of maleic anhydride, 74 parts of phthalic anhydride, 14 parts of 2-hydroxy-propane-2-phosphonic acid, 58 parts of 2,3-dibromopropane-1,2-dicarboxylic acid (an addition product of bromine to itaconic acid), and 136.4 parts of ethylene glycol was condensed in the presence of 0.26 parts of triphenylphosphite and 0.05 part of hydroquinone in a condensation flask provided with a stirrer, a thermometer, a receiver and a gas inlet tube at a temperature of 180° C., carbon dioxide being slowly passed through all the time, until the acid value was 106. The reaction mixture was cooled down to 120° C., mixed with 60 parts of dicyclopentadiene, reheated over one hour to 180° C. and condensed for a further 80 to 90 minutes at this temperature—the last 15 minutes under the vacuum of a water jet pump. 377 parts of a light coloured polyester having an acid value of 40 were obtained from which moulded bodies having flame resistant properties could be produced after copolymerisation of the resin with 162 parts of styrene.

Example 7

17.7 parts of phosphorus trichloride were added to 136.4 parts of ethylene glycol. After termination of the exothermic reaction and accompanying evolution of hydrochloric acid, the solution obtained was mixed with 117.6 parts of maleic anhydride, 74 parts of phthalic anhydride and 92.7 parts of tetrabromophthalic anhydride and condensed using the general method of Example 6, while keeping the esterification temperature at not more than 165° C. The reaction mixture had an acid value of 108 before the addition of the dicyclopentadiene (60 parts), and an acid number of 41 after terminating the condensation. The index of flame resistance (according to Hammerl) of round sticks of 8.5 mm. diameter which had been obtained by hardening a mixture of 44.5 parts of the polyester so obtained and 19.1 parts of styrene, was 100.

Example 8

814 parts of a polyester were obtained by reacting a mixture of 235 parts of maleic anhydride, 148 parts of phthalic anhydride, 92.8 parts of 2,3-dibromopropionic acid, 28 parts of 2-hydroxypropane-2-phosphonic acid, 248 parts of ethylene glycol, 47.2 parts of trimethylolpropane and 120 parts of dicyclopentadiene in the manner described in Example 6. Moulded bodies which were obtained by hardening a 70% solution of this polyester in styrene were fire-retardant.

Example 9

117.6 parts of maleic anhydride, 78.5 parts of phthalic anhydride, 130 parts of 9,10,12,13,15,16-hexbromo-octadecanoic acid, 11.1 parts of 90% phosphoric acid and 136.4 parts of ethylene glycol were condensed using the general method of Example 6 after the addition of 0.05 part of hydroquinone and 0.35 part of triphenylphosphite, until the acid value was down to 85. Thereafter 60 parts of dicyclopentadiene were added and the final condensation was carried out in the usual manner. 435 parts of a light-brown polyester having an acid value of 32 were obtained which could be hardened to brownish moulded bodies after the admixture of 186 parts of styrene. Round sticks of 8.5 mm. diameter had a bending strength of 1400 kg./cm.$^2$ and an inlex of flame resistance of 80 (according to Hammerl).

Example 10

A mixture of 323.4 parts of maleic anhydride, 266.4 parts of phthalic anhydride, 165.3 parts of dibromosuccinic acid, 93.5 parts of an ester of vinylphosphonic acid and 2,2-dimethyl-propanediol-1,3 (produced by heating 1 mol of vinylphosphonic acid dicloride with 2 mols of 2,2-dimethylpropanediol-1,3 while removing the hydrochloric acid formed), 409.2 parts of ethylene glycol and 0.28 part of tert.-butyl-hydroquinone was condensed in the apparatus as described in Example 1 in the presence of 0.78 part of triphenyl-phosphite and with carbon dioxide being passed through, at a temperature of 180° C., until the reaction product had an acid value of 100. The product was cooled to 120° C., mixed with 180 parts of dicyclopentadiene and reheated over one hour to 180° C. This temperature was maintained for a further 1–1.5 hours, during the last 20 minutes thereof by applying the vacuum of a water jet pump. The resin was cooled to 120° C., mixed with 508 parts of styrene and well stirred. A resin solution was obtained which at room temperature had a viscosity of 1080 cp. and an acid value of 24. A round stick of 8.5 mm. diameter produced from this solution had a flame resistance index of 84.

What is claimed is:

1. A fire-retardant polyester resin (II) having an acid value of not more than 70 and comprising the addition product of dicyclopentadiene to the free carboxyl and hydroxyl groups of polyester resin (I) in an amount of from 0.05 to 0.6 mol of dicyclopentadiene per mol of dicarboxylic acid component in said polyester resin (I), said polyester resin (I) having an acid value of not more than 150 and being obtained by reacting a mixture (III) of (A) 0.4 to 0.8 mol of at least one reactant selected from the group consisting of (A1) dicarboxylic acids, (A2) anhydrides of (A1), (A3) mixtures of any one of (A1) and (A2), with monobasic carboxylic acids, (A4) mixtures of any one of (A1) to (A3) with at least tribasic carboxylic acids, and (A5) mixtures of any one of (A1) to (A4) with chlorine-containing groups of component (A) being derived from dicarboxylic acids, (B) 0.05 to 0.4 mol of at least one bromine-containing carboxylic acid, (C) 0.01 to 0.2 mol of at least one condensable phosphorus-containing compound and (D) at least one reactant selected from the group consisting of (D1) dihydric alcohols, (D2) mixtures of (D1) with monohydric alcohols, (D3) mixtures of any one of (D1) and (D2) with at least trihydric alcohols, and (D4) mixtures of any one of (D1) to (D3) with halogenated alcohols, at least 75% of the hydroxy groups of component (D) being derived from dihydric alcohols.

in which mixture (III) at least 20% of the total amount of equivalents of the carboxylic acid component and the hydroxy component contain a copolymerisable olefinic bond and the hydroxy component (D) is present in an amount ranging from 50 equivalent percent higher to 50 equivalent percent lower than the equivalent amount of acid groups of components (A), (B) and (C), said polyester resin (II) containing bromine and phosphorus in an amount together equaling at least 2% by weight.

2. A fire-retardant polyester resin as claimed in claim 1, having an acid value of from 30 to 50.

3. A fire-retardant polyester resin as claimed in claim 1 containing at least 2% by weight of bromine and at least 0.2% by weight of phosphorus.

4. A fire-retardant polyester resin as claimed in claim 3 containing at least 4% by weight of bromine and at least 0.4% by weight of phosphorus.

5. A fire-retardant polyester resin as claimed in claim 1, wherein the polyhydroxy compound (D) is an ether of an at least trihydric alcohol which still contains two free hydroxy groups.

6. A fire-retardant polyester resin (II) as claimed in claim 1, wherein the polyester resin (I) has an acid value in the range from 70 to 150 and is a reaction product of a dicarboxylic acid component containing a substantial amount of an $\alpha,\beta$-olefinically unsaturated dicarboxylic acid component, a bromine-containing carboxylic acid being a polyfunctional carboxylic acid containing at least two bromine atoms in the molecule, a phosphorus-containing compound and a polyhydric alcohol, at least 25% of the total amount of the equivalents of the carboxylic acid component and the hydroxy component containing a polymerisable or copolymerisable olefinic bond.

7. A fire-retardant polyester resin as claimed in claim 6 wherein the polyester resin (I) has an acid value in the range from 100 to 130 and is a reaction product of 0.5 to 0.7 mol of a dicarboxylic acid containing a substantial amount of an $\alpha,\beta$-olefinically unsaturated dicarboxylic acid, 0.1 to 0.3 mol of a bromine-containing carboxylic acid, 0.01 to 0.2 mol of a phosphorus-containing compound and an aliphatic polyhydric alcohol.

8. A fire-retardant polyester resin as claimed in claim 1 wherein the polyester resin (I) has an acid value in the range from 70 to 90, and the final polyester resin (II) has an acid value at least 20 units lower than that of the polyester resin (I).

9. A fire-retardant polyester resin as claimed in claim 1, wherein the bromine-containing carboxylic acid (B) used is a polybromo-addition product of an olefinically unsaturated carboxylic acid.

10. A fire-retardant polyester resin as claimed in claim 6, wherein the bromine-containing carboxylic acid is a dibromo-addition product of a dicarboxylic acid having a transconfiguration.

11. A fire-retardant polyester resin (II) as claimed in claim 1 whenever stabilized by a polymerisation inhibitor.

12. A fire-retardant copolymer whenever derived by copolymerising a polyester resin (II) as claimed in claim 1 with at least one ethylenically unsaturated polymerisable monomer containing the group $CH_2=C<$.

13. A fire-retardant copolymer as claimed in claim 12 derived from an ethylenically unsaturated monomer and the polyester (II) in a ratio lying in the range of from 4:1 to 1:9 by weight.

14. A fire-retardant copolymer as claimed in claim 13, wherein said ratio is in the range of from 1:1 to 1:4 by weight.

15. A fire-retardant resin derived by reacting a polyester resin (II) as claimed in claim 1 with a polyisocyanate.

16. A copolymerisable moulding composition comprising a fire-retardant polyester resin (II) as claimed in claim 1, and at least one ethylenically unsaturated polymerisable monomer, having the group $CH_2=C<$.

17. A copolymerisable moulding composition as claimed in claim 16, which also contains a free-radical-forming polymerisation catalyst.

18. Shaped bodies produced from a product as claimed in claim 1.

19. A process for preparing fire retardant polyester resins (II) comprising first preparing a polyester resin (I) by esterifying a mixture (III) of (A) 0.4 to 0.8 mol of at least one reactant selected from the group consisting of (A1) dicarboxylic acids, (A2) anhydrides thereof, (A3) mixtures of any one of components (A1) and (A2) with monobasic carboxylic acids, (A4) mixtures of any one of (A1) to (A3) with at least tribasic carboxylic acids, and (A5) mixtures of any one of (A1) to (A4) with chlorine-containing carboxylic acids, at least 75% of the carboxylic acid groups of component (A) being derived from dicarboxylic acids, (B) 0.05 to 0.4 mol of at least one bromine-containing carboxylic acid, (C) 0.01 to 0.2 mole of at least one condensable phosphorus-containing compound and (D) at least one reactant selected from the group consisting of (D1) dihydric alcohols, (D2) mixtures thereof with monohydric alcohols, (D3) mixtures of any one of (D1) to (D2) with at least trihydric alcohols, and (D4) mixtures of any one of (D1) to (D3) with halogentaed alcohols at least 75% of the hydroxy groups of component (D) being derived from dihydric alcohols, in which mixture (III) at least 20% of the total amount of equivalents of the carboxylic acid component and the hydroxy component contain a copolymerisable olefinic bond and the hydroxy component (D) is present in an amount ranging from 50 equivalent percent higher to 50 equivalent percent lower than the equivalent amount of acid groups of components (A), (B) and (C) to yield a polyester resin (I) having an acid value of not more than 150, then adding to said polyester (I) 0.05 to 0.6 mol dicyclopentadiene per mol of dicarboxylic acid contained in the polyester (I) at a temperature in the range from 100° to 140° C. and, after the dicyclopentadiene has substantially been added to the polyester resin (I), further condensing at a temperature in the range from 160 to 220° C. to yield a polyester resin (II) which has an acid value of not more than 70 and contains bromine and phosphorus in an amount of together at least 2% by weight.

References Cited

UNITED STATES PATENTS

| | | | |
|---|---|---|---|
| 2,671,070 | 3/1954 | Knopp | 260—75 |
| 2,819,247 | 1/1958 | Lundberg | 260—869 |
| 2,852,487 | 9/1958 | Maker | 260—861 |
| 2,951,823 | 9/1960 | Sauer | 260—871 |

FOREIGN PATENTS

| | | |
|---|---|---|
| 1,150,203 | 6/1963 | Germany. |
| 823,224 | 11/1959 | Great Britain. |
| 968,910 | 9/1964 | Great Britain. |
| 1,317,444 | 1/1963 | France. |

OTHER REFERENCES

Handbook of Chemistry and Physics, Chemical Rubber Co. 45th edition, 1964–1965, QD 65 C4 C.5 (page C–288 relied on).

MURRAY TILLMAN, *Primary Examiner.*
J. T. GOOLKASIAN, *Assistant Examiner.*

UNITED STATES PATENT OFFICE
CERTIFICATE OF CORRECTION

Patent No. 3,333,022                          July 25, 1967

Fritz Reiners et al.

It is certified that error appears in the above identified patent and that said Letters Patent are hereby corrected as shown below:

In the drawing, sheet 1, Fig. 1, "With $(HOOC\ CHB)_2$" should read -- With $(HOOC\ CHBr)_2$ --.

Signed and sealed this 23rd day of September 1969.

(SEAL)
Attest:

Edward M. Fletcher, Jr.                      WILLIAM E. SCHUYLER, JR.
Attesting Officer                              Commissioner of Patents